(12) United States Patent
Hsieh

(10) Patent No.: US 11,325,675 B1
(45) Date of Patent: May 10, 2022

(54) BICYCLE CLEAT

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days.

(21) Appl. No.: 17/399,021

(22) Filed: Aug. 10, 2021

(51) Int. Cl.
  *B62M 3/08* (2006.01)
(52) U.S. Cl.
  CPC .................................. *B62M 3/086* (2013.01)
(58) Field of Classification Search
  CPC ..................................................... B62M 3/086
  See application file for complete search history.

(56) References Cited

U.S. PATENT DOCUMENTS

| | | | |
|---|---|---|---|
| 6,694,846 B2 * | 2/2004 | Muraoka | B62M 3/086 36/131 |
| 6,845,688 B2 * | 1/2005 | Muraoka | B62M 3/086 36/131 |
| 8,646,359 B2 | 2/2014 | Hsieh et al. | |
| 10,745,080 B1 * | 8/2020 | Chen | B62M 3/086 |
| 2007/0094898 A1 * | 5/2007 | Xie | A43B 5/14 36/131 |

* cited by examiner

*Primary Examiner* — Vicky A Johnson

(57) ABSTRACT

A cleat for being attached on a sole of a cycling shoe to be engaged with a clipless pedal is disclosed. The cleat includes a front engagement portion, a rear engagement portion and a front attachment portion. A width of the rear engagement portion is greater than a width of the front engagement portion. The front attachment portion protrudes from the bottom of the front engagement portion and includes a U-shaped body and two abutment portions. The U-shaped body has two legs and an opening between outer ends of the two legs. The opening is toward the rear engagement portion. Each of the two abutment portions inward bendingly extends from the outer end of one of the legs so as to make a width of the opening between the abutment portions less than a distance between internal sides of the two legs.

6 Claims, 4 Drawing Sheets

BICYCLE CLEAT

BACKGROUND

Technical Field

The invention relates to bicycles, particularly to bicycle pedals.

Related Art

Racing bicycles always use clipless pedals (clip-in pedals), which can engage with a cleat fastened on a sole of a cycling shoe make a rider's feet fixed connect with cranks to improve the stepping efficiency. The cleat has a front engagement portion and a rear engagement portion, which can engage with a front hook and a rear hook of a clipless pedal, respectively. The front hook is immovable and the rear hook is elastically pivoted. When clipping in, the front engagement portion of the cleat must be inserted in the front hook, and then press down the heel to make both the rear hook and the rear engagement portion form unidirectional engagement to prevent reversed escape. When clipping out, the heel must be outward rotated to separate the rear engagement portion from the rear hook, and then rearward move the tiptoe to separate the front engagement portion from the front hook.

As abovementioned, the connection between a cleat and a pedal locates only at the front end and the rear end. There is no support or connection at the middle. As a result, the connection between a cleat and a pedal is not stable enough. Also, no prevention is provided to avoid unexpected lateral slide of a foot. Thus, unexpected clipping out occasionally occurs. For riders, this is potential danger. As a result, an improved cleat appears in the market. As shown in FIGS. 2 and 7 of U.S. Pat. No. 8,646,359, each of two ends of the U-shaped front engagement portion 34 is protruded with an abutment block 351, 352. The abutment blocks 351, 352 separately abut against the wing edges 21, 22 to form the third joint. This improves stability of engagement between the cleat and the pedal and avoid unexpected clipping out due to slide.

However, the width of such an abutment block is narrow, so the contact between the abutment block and the wing edge is merely of a point shape. Stability and anti-slide resistance provided by the abutment blocks are insufficient. It still needs to be further improved.

SUMMARY

An object of the invention is to provide a bicycle cleat, which can increase stability and anti-sliding resistance of the connection between the abutment blocks and the wing edges. This makes the cleat engages with a pedal more stably and avoids unexpected clipping out of the cleat more effectively.

To accomplish the above object, the invention provides a bicycle cleat, which includes a front engagement portion, a rear engagement portion and a front attachment portion. A width of the rear engagement portion is greater than a width of the front engagement portion. The front attachment portion protrudes from the bottom of the front engagement portion and includes a U-shaped body and two abutment portions. The U-shaped body has two legs and an opening between outer ends of the two legs. The opening is toward the rear engagement portion. Each of the two abutment portions inward bendingly extends from the outer end of one of the legs so as to make a width of the opening between the abutment portions less than a distance between internal sides of the two legs.

DETAILED DESCRIPTION

Figure 1:
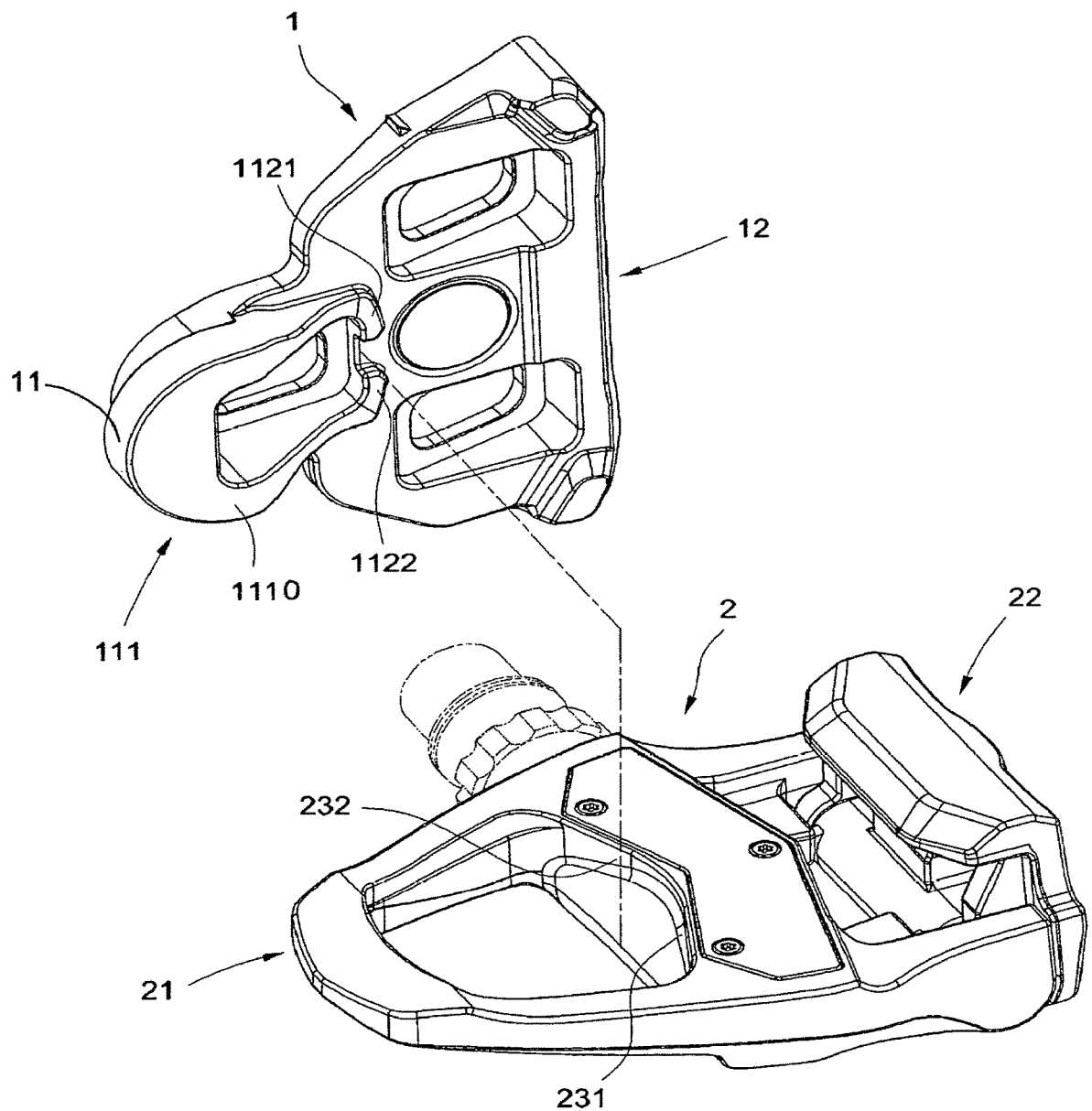
FIG. 1 is an exploded schematic view of the bicycle cleat of the invention and a pedal.

Please refer to FIG. 1. The invention provides a bicycle cleat 1 for being mounted on a sole of a cycling shoe. The cleat 1 may engage with a clipless pedal 2. The pedal 2 has a front hook 21 and a rear hook 22. The cleat 1 includes a front engagement portion 11, a rear engagement portion 12 and a front attachment portion 111. A width of the rear engagement portion 12 is greater than a width of the front engagement 11. The front engagement portion 11 and the rear engagement portion 12 correspond to the front hook 21 and the rear hook 22, respectively. A side of the spindle of the pedal 2, which is toward the front hook 21, is formed with two wing edges 231, 232 which are arranged into a vee shape.

Figure 2:
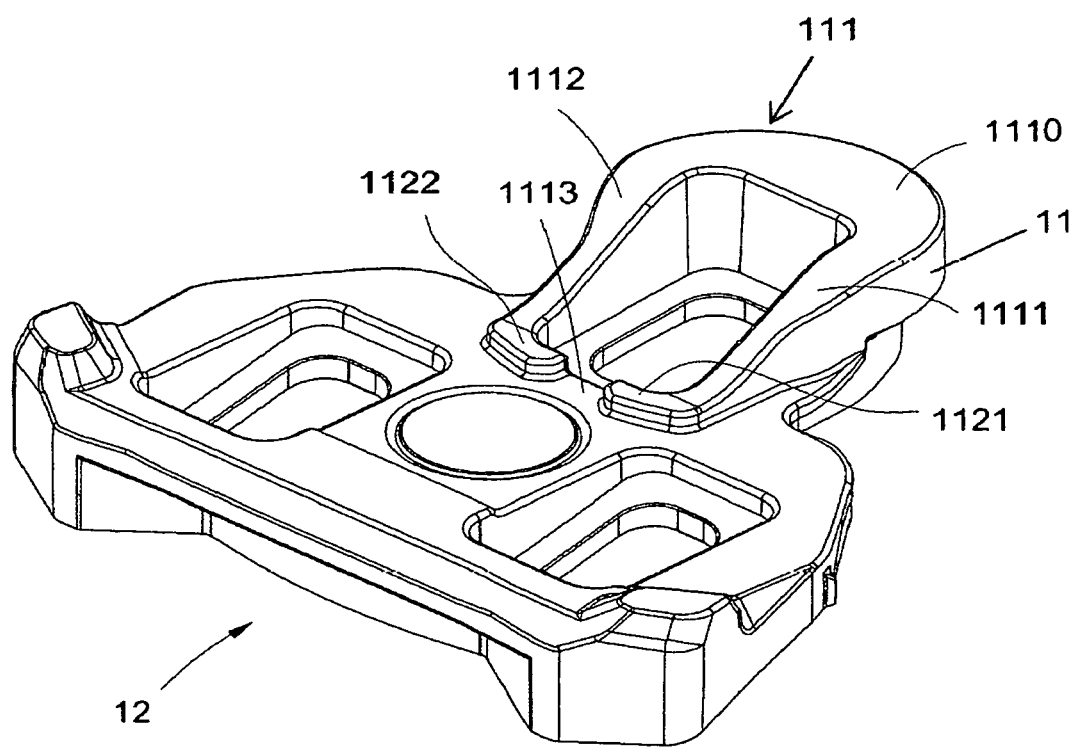
FIG. 2 is a perspective view of the bicycle cleat of the invention.
Figure 3:
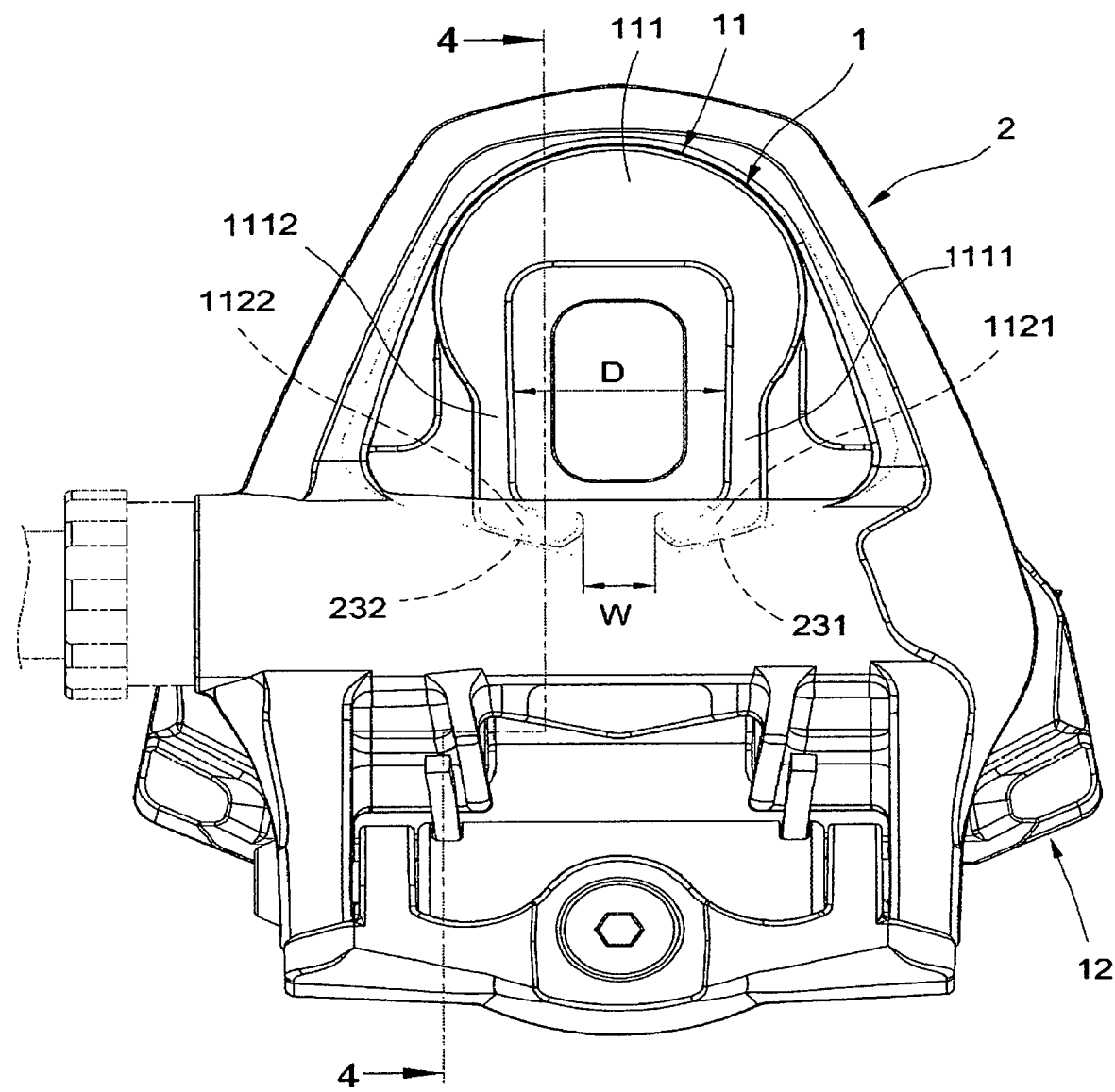
FIG. 3 is a top view of the bicycle cleat of the invention clipped in a pedal.

Please refer to FIGS. 2 and 3. The front attachment portion 111 protrudes from the bottom of the front engagement portion 11 and includes a U-shaped body 1110 and two abutment portions 1121, 1122. The U-shaped body 1110 has two legs 1111, 1112 and an opening 1113. The opening 1113 is located between outer ends of the two legs 1111, 1112 and is toward the rear engagement portion 12. Each of the two abutment portions 1121, 1122 inward bendingly extends from the outer end of one of the legs 1111, 1112. In other words, the two abutment portions 1121, 1122 substantially extend toward each other so as to make a width W of the opening 1113 between the abutment portions 1121, 1122 less than a distance D between internal sides of the two legs 1111, 1112. Preferably, as shown in FIG. 3, the width W may be less than one second of the distance D. More preferably, the width W may be equal to or less than one third of the distance D. The bending angle of each abutment portion 1121, 1122 and one of the legs 1111, 1112, which connects thereto, is about 100 to 110 degrees.

Figure 4:
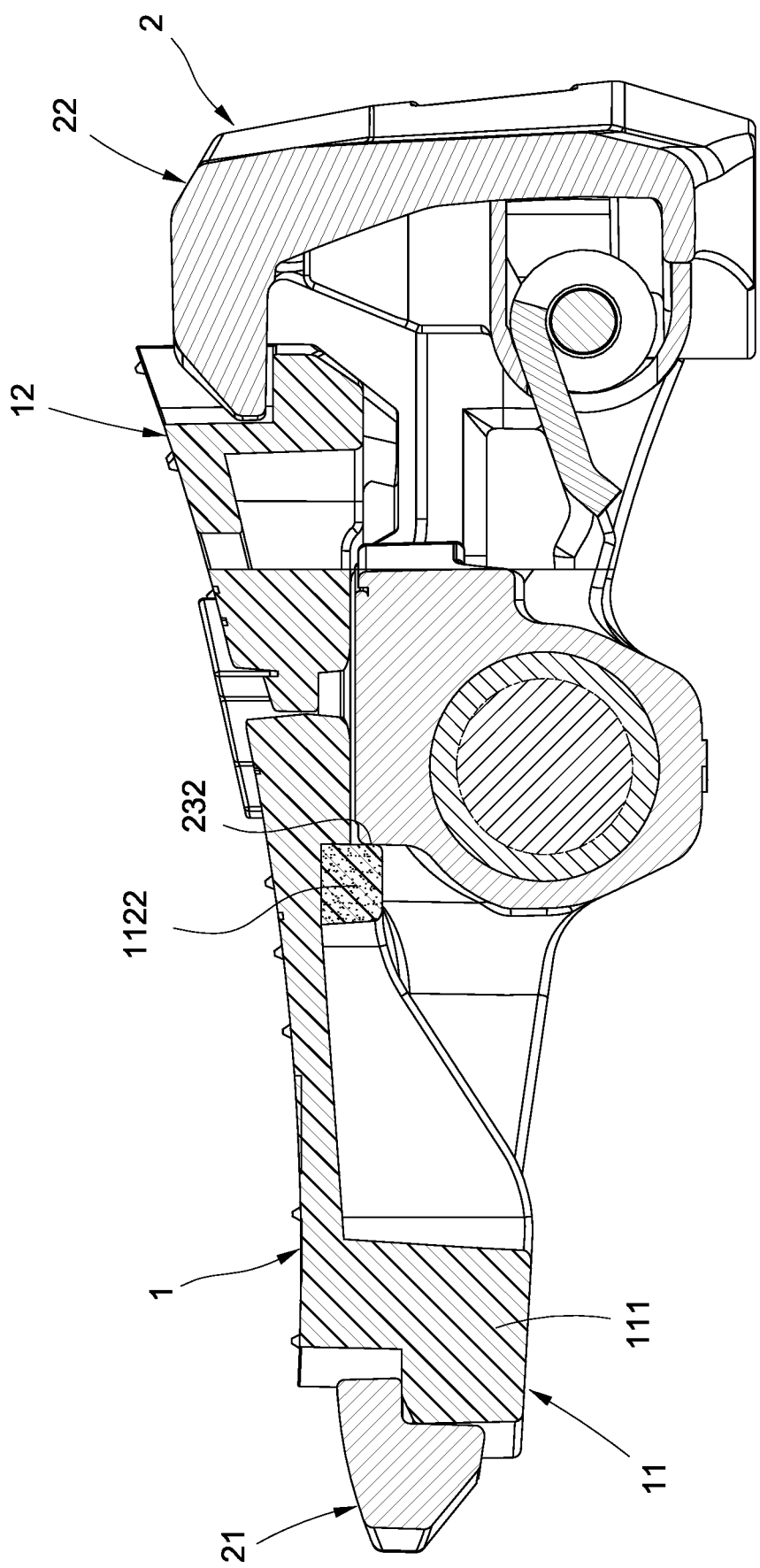
FIG. 4 is a cross-sectional view along line 4-4 in FIG. 3.

Please refer to FIGS. 3 and 4. When the cleat 1 has engaged with the pedal 2, the two abutment portions 1121, 1122 separately abut against the wing edges 231, 232. The abutment portions 1121, 1122 are elongated, so the contact between the abutment portion 1121 or 1122 and the wing edge 231 or 232 is linear. This makes the engagement between the cleat 1 and pedal 2 more stable to increase the anti-sliding resistance of the cleat 1 and to avoid unexpected clipping out due to lateral sliding.

In addition, to allow a rider to comfortably walk on the ground when leaving his or her bicycle, the U-shaped body 1110 may be made of soft material such as rubber. The abutment portions 1121, 1122 are integratedly formed with the cleat body, i.e., hard material for better resistance to wear.

While this disclosure has been described by means of specific embodiments, numerous modifications and variations could be made thereto by those skilled in the art without departing from the scope and spirit of this disclosure set forth in the claims.

What is claimed is:

1. A bicycle cleat comprising:
a front engagement portion;
a rear engagement portion whose width is greater than a width of the front engagement portion; and
a front attachment portion, protruding from a bottom of the front engagement portion, comprising a U-shaped body and two abutment portions, the U-shaped body having two legs and an opening between outer ends of the two legs, the opening being toward the rear engagement portion, and each of the two abutment portions inward bendingly extending from the outer end of one of the legs so as to make a width of the opening between the abutment portions less than a distance between internal sides of the two legs.

2. The bicycle cleat of claim 1, wherein the U-shaped body is made of soft material.

3. The bicycle cleat of claim 2, wherein the U-shaped body is made of rubber.

4. The bicycle cleat of claim 3, wherein a width of the opening between the abutment portions is less than one second of a distance between internal sides of the two legs.

5. The bicycle cleat of claim 4, wherein the width is equal to or less than one third of the distance.

6. The bicycle cleat of claim 1, wherein a bending angle of each abutment portion and connective one of the legs is between 100 and 110 degrees.

\* \* \* \* \*